United States Patent [19]

Willis et al.

[11] Patent Number: 5,304,238

[45] Date of Patent: Apr. 19, 1994

[54] PLASTICIZED SULFUR COMPOSITIONS AND METHOD OF MANUFACTURING SAME

[75] Inventors: Charles G. Willis, Austin; Barry R. Miller, Dallas, both of Tex.; Stanley J. Marwil, Bartlesville, Okla.

[73] Assignee: Kwik-Mark Joint Venture, Dallas, Tex.

[21] Appl. No.: 832,363

[22] Filed: Feb. 7, 1992

[51] Int. Cl.$^5$ .............................................. C09D 11/00
[52] U.S. Cl. .................... 106/19 F; 106/287.32; 106/436; 106/493; 106/503
[58] Field of Search ...................... 106/287.32, 19, 436, 106/493, 19 F; 427/136-139

[56] References Cited

U.S. PATENT DOCUMENTS

| | | | |
|---|---|---|---|
| 3,050,452 | 8/1962 | Louthan | 204/162 |
| 3,434,852 | 3/1969 | Louthan | 106/19 |
| 3,674,525 | 7/1972 | Louthan | 106/287.32 |
| 3,676,166 | 7/1972 | Louthan | 106/241 |
| 3,730,850 | 5/1973 | Louthan | 203/52 |

Primary Examiner—Linda Skaling
Assistant Examiner—Margaret Einsmann
Attorney, Agent, or Firm—W. Kirk McCord

[57] ABSTRACT

Plasticized sulfur compositions suitable for use as road-marking material are comprised of elemental sulfur, plasticized sulfur, a viscosity control agent and solid filler material. The plasticized sulfur is deodorized by distilling a solvent stripping agent having an initial boiling point greater than 350° F. and a boiling range less than 100° F. The solid filler material preferably includes substantially equal quantities of silica and calcium carbonate. Titanium dioxide is also included in the solid filler. Both white and yellow-colored paints can be manufactured according to the present invention. The yellow paint includes a yellow pigment in addition to the titanium dioxide, silica and calcium carbonate filler material. In one embodiment, lead chromate is used as the yellow pigment. In another embodiment, an organic yellow pigment, such as an arylide yellow, is used as the pigment. When the organic pigment is used, it is added after other solid materials have been mixed into the paint and the paint has been cooled to a temperature below the degradation temperature of the organic yellow pigment.

8 Claims, No Drawings

PLASTICIZED SULFUR COMPOSITIONS AND METHOD OF MANUFACTURING SAME

FIELD OF INVENTION

This invention relates generally to plasticized sulfur compositions and in particular to plasticized sulfur compositions suitable for use as road-marking materials.

BACKGROUND OF THE INVENTION

Materials used as road markings must meet certain standards, including prescribed standards of color, reflectivity and durability. The materials must be sufficiently reflective to provide adequate visibility for night driving. The materials must also be substantially resistant to ultraviolet rays from the sun during the daytime. Furthermore, the materials should be compatible with rapid application operations, such as by spraying.

DESCRIPTION OF THE PRIOR ART

Road-marking materials have included both oil-based and water-based paints, as well as thermoplastic material. However, these materials have several disadvantages. The oil-based paints tend to emit volatile fumes, which not only degrade the environment, but also reduce the durability of the paint. Similarly, water-based paints typically do not have sufficient durability for road use. Thermoplastic materials are applied to a road surface by spraying at high temperature to apply a relatively thick (approximately 90 mils) layer to effect the proper thermal bond between the thermoplastic and an asphalt road surface. Furthermore, glass beads, which are often used to enhance the reflectivity of the road markings, must be mixed with the thermoplastic prior to application.

It is known in the art to use plasticized sulfur compositions as road-marking material. Examples of such plasticized sulfur compositions are disclosed in U.S. Pat. Nos. 3,050,452; 3,434,852; 3,674,525; 3,676,166; and 3,730,850. Several problems have been encountered in connection with the use of prior art plasticized sulfur compositions as road markings. One problem has been the difficulty of forming the composition to meet applicable color standards. Other problems relate to the objectionable odors emitted by the material and the high viscosity of the material, which makes it difficult to apply such materials to surfaces at a rapid rate, such as by spraying.

The prior art has been able to solve the odor problem by adding a solvent stripping agent and distilling the stripping agent to remove unreacted mercaptans and other odor-causing material from the composition and the viscosity problem by adding a viscosity control agent, such as biphenyl. However, the use of biphenyl resulted in a highly objectionable odor, which made the plasticized sulfur composition unusable in urban areas. A plasticized sulfur composition with color, durability and odor characteristics meeting applicable road-marking standards has not been heretofore available.

DISCLOSURE OF THE INVENTION

In accordance with the present invention, a composition is provided which is comprised of respective predetermined amounts of elemental sulfur, plasticized sulfur and a solid filler. In accordance with a feature of the invention, the filler includes both silica and calcium carbonate, with the quantity of silica being at least equal to the quantity of calcium carbonate by weight. In one embodiment, the quantity of silica is substantially equal to the quantity of calcium carbonate by weight. In another embodiment the filler further includes a predetermined quantity of titanium dioxide.

In accordance with another feature of the invention, a deodorizing agent is provided for removing odor causing material from the plasticized sulfur. The deodorizing agent is selected from the group of solvent stripping agents having an initial boiling point greater than 350°. In another embodiment, the boiling range of the solvent stripping agent is less than 100° F.

In accordance with yet another feature of the invention, the solid filler includes a yellow color pigment comprised of a predetermined quantity of lead chromate. In one embodiment, the quantity of lead chromate is in the range of 15–30% by weight of the solid filler. Titanium dioxide in the range of 1–5% by weight is also added when lead chromate is used. In an alternate embodiment, the lead chromate is replaced with an organic yellow pigment. The organic yellow pigment is preferably an arylide yellow pigment. In one embodiment, the quantity of the organic yellow pigment is in the range of 5–15% by weight of the solid filler. Titanium dioxide in the range of 5–15% by weight is also added when the organic pigment is used.

A plasticized sulfur composition is preferably formed by mixing elemental sulfur, a plasticizing agent, such as ethyl cyclohexane dimercaptan and a viscosity control agent, such as acrylic acid, and heating the mixture to 300°–320° F. to form the plasticized sulfur. The plasticized sulfur is then deodorized by distilling with the solvent stripping agent to remove odor-causing materials, such as unreacted mercaptans. The solid filler materials are then added to the deodorized plasticized sulfur, along with additional elemental sulfur. A thinning agent, such as Santowax, is also added to reduce the viscosity of the mixture. The mixture is then cooled to a temperature of 250° F.–260° F. and stirred vigorously to mix in the solid filler material.

In accordance with a further feature of the invention, when the organic yellow pigment is used, the pigment is added after the mixture has cooled below the degradation temperature of the organic yellow pigment. Because the organic yellow pigment is not stable above certain temperatures, it should be added after the other filler material has been mixed with the plasticized sulfur and the mixture has been cooled below the degradation temperature of the organic yellow pigment.

In accordance with the present invention, a plasticized sulfur composition is provided which is well-suited for use as a road-marking material, with good color and reflectivity characteristics as well as durability. The composition is compatible for rapid application, such as by spraying, and is further compatible to accommodate the addition of glass beads or other reflective material after the composition is applied to a road surface. The composition can be manufactured to meet applicable highway department standards for both white and yellow-colored road markings.

DETAILED DESCRIPTION OF THE PREFERRED EMBODIMENTS

Plasticized sulfur compositions, including sulfur-based paints, are manufactured in accordance with the present invention. A sulfur-based paint may be manufactured with a white color or alternatively, a yellow color pigment may be added with the desired color characteristics. Paints used as road-marking material must meet applicable highway department standards, including color standards, reflectivity and durability. Furthermore, increasingly stringent environmental standards have eliminated the use of paints containing toxic materials and other volatiles. Sulfur-based paints typically have a notoriously unpleasant odor. The paints must therefore be deodorized in order to conform to applicable highway department standards.

A sulfur-based paint having application as a white-colored road-marking material is preferably manufactured by the following process.

The first step in the process is to prepare the plasticized sulfur, which is hereinafter referred to as the plasticizing step. A polythiol, such as ethyl cyclohexane dimercaptan, is mixed with elemental sulfur and a viscosity control agent, such as acrylic acid. The mixture is heated to a temperature in the range of about 290° F.–360° F, (preferably within the range of about 300° F.–320° F.) for a period of time in the range of about five minutes to about two days (preferably in the range of about 30 minutes to about three hours). The mixture is heated to a molten state and a chemical reaction occurs, which results in the formation of a plasticized sulfur composition of reduced viscosity. The relative concentrations of the ingredients are about 14 parts polythiol to 10.5 parts elemental sulfur to two parts acrylic acid by weight. The process for forming the plasticized sulfur is described in greater detail in U.S. Pat. No. 3,434,852, which is incorporated by reference herein.

The polythiol may be formed by reacting an ethylenically unsaturated compound with hydrogen sulfide in the presence of ultraviolet radiation with trimethyl phosphite as a reaction promoter. The process of forming the polythiol is described in greater detail in U.S. Pat. No. 3,050,452, which is incorporated by reference herein.

After the plasticized sulfur composition is formed, the composition must be deodorized to remove odor-causing materials, such as unreacted polythiol (mercaptans). Typically, approximately 90% of the polythiol will react chemically with the elemental sulfur to form the plasticized sulfur composition. The unreacted polythiol causes the composition to have an unpleasant odor. In the deodorizing step, a solvent stripping agent is added to the plasticized sulfur composition and the mixture is heated to a temperature of about 290° F.–320° F. (preferably 300° F.) for approximately one hour in a partial vacuum (e.g., about 25 mm Hg pressure). The solvent stripping agent is distilled from the mixture, along with the odor-causing materials, to substantially deodorize the plasticized sulfur composition.

According to the teachings of the prior art, as described in U.S. Pat. No. 3,730,850, the solvent stripping agent should not have an initial boiling point above 350° F. or have an a narrow boiling range (i.e., less than 100° F.). However, Applicants have determined by experimentation that deodorizing can be effectively accomplished using a solvent stripping agent having an initial boiling point above 350° F. and a boiling range less than a 100° F. One such solvent stripping agent which is suitable for use in connection with plasticized sulfur compositions is the solvent stripping agent sold by Exxon Corporation under the trademark "Isopar M", which has an initial boiling point of about 433° F. and a boiling range of about 53° F. Isopar M is an aliphatic straight chain solvent with approximately 79% by weight paraffin and approximately 21% by weight cycloparaffin. The amount of the solvent stripping agent added to the plasticized sulfur composition is approximately one part solvent stripping agent to 3–4.5 (preferably 3.14) parts plasticized sulfur, by weight.

Following the deodorizing step, additional elemental sulfur (in a molten state) is added to the deodorized plasticized sulfur. A liquid thinning agent, such as Santowax, is also added. Santowax, which is sold by Monsanto Corporation, is a mixture of orthoterphenyls, paraterphenyls, and metaterphenyls, together with higher polyphenyls, the higher polyphenyls typically comprising 20% or less by weight of the mixture. The respective amounts of the elemental sulfur and the thinning agent added to the plasticized sulfur is such that the relative concentrations of the ingredients are about 25.1 parts plasticized sulfur (including two parts acrylic acid), 76.9 parts elemental sulfur and 20.8 parts thinning agent, by weight. The amount of thinning agent by weight is about 90% of the total weight of the sulfur and reacted mercaptan in the plasticized sulfur composition.

After the additional sulfur and the thinning agent are added to the plasticized sulfur, the solid filler is added and the entire mixture is heated to a temperature of at least 250° F. with vigorous stirring for one hour. The final mixture is comprised of about 60% liquid ingredients (plasticized sulfur, elemental sulfur and thinning agent) by weight and about 40% solid filler by weight. The solid filler material is added to give the paint the desired texture and durability.

In accordance with a unique feature of the invention, the solid filler material includes both silica and calcium carbonate in a ratio such that the quantity of silica by weight is at least equal to the quantity of calcium carbonate by weight. Preferably, the quantity of silica is about equal to the quantity Of calcium carbonate by weight. Applicants have determined by experimentation that the addition of both silica and calcium carbonate provides superior paint quality as compared to a paint manufactured with either the silica or the calcium carbonate, but not both, used as a filler. The prior art, as exemplified by U.S. Pat. No. 3,674,525, teaches that filler material can be selected from a group of materials which includes, inter alia, silica and calcium carbonate. However, the superior results obtained by including both calcium carbonate and silica in a sulfur-based paint have not been heretofore known.

The solid filler preferably includes a predetermined quantity of titanium dioxide. In one embodiment, the filler is comprised of about 37.5% silica, about 37.5% calcium carbonate and about 25% titanium dioxide by weight. The titanium dioxide enhances the brightness of the white-colored paint.

In another embodiment, an aluminum silicate, such as Kaolin, is added, along with the silica, calcium carbonate and titanium dioxide to further enhance the brightness of the white sulfur-based paint. The amount of Kaolin is preferably in the range of 1.25–5.0% by weight of the solid filler material.

The use of titanium dioxide as a filler in a white sulfur-based paint is known in the art. However, Applicants have determined by experimentation that the inclusion of titanium dioxide in the solid filler enhances the color characteristics of a yellow sulfur-based paint as well. The remainder of the solid filler material is comprised of silica, calcium carbonate and the yellow color pigment.

In accordance with another feature of the invention, a predetermined quantity of lead chromate is used as the yellow color pigment. The amount of lead chromate added to the paint is preferably in the range of 15-30% by weight of the solid filler material. Titanium dioxide in the range of 1-5% by weight is also included in the filler. The remainder of the filler is preferably comprised of equal amounts of silica and calcium carbonate by weight.

In accordance with yet another feature of the invention, a lead-free yellow pigment can be used in lieu of the lead chromate. The lead-free pigment is preferably an organic yellow dye, such as the arylide yellow pigment sold under the trademark "Sunsperse" by Sun Chemical Corporation of Cincinnati, Ohio such as Sunsperse 74 and/or Sunsperse 75. Sunperse 74 has a chemical formula of $C_{17}H_{15}ClN_4O_5$ and Sunsperse 75 has a chemical formula of $C_{18}H_{17}ClN_4O_5$. When the organic yellow pigment is used, the yellow pigment represents approximately 5-15% by weight of the solid filler material. The concentration of titanium dioxide is typically higher when the organic yellow pigment is used than when lead chromate is used as the pigment. For example, the amount of titanium dioxide is preferably in the range of 5-15% by weight of the solid filler material when the organic yellow pigment is used, as compared to 1-5% by weight when lead chromate is used. The remainder of the solid filler is comprised of equal amounts of silica and calcium carbonate by weight.

One of the problems associated with organic yellow color pigments is that the pigments are not heat stable at temperatures at which the solid filler material is mixed into the paint. As previously mentioned, mixing the filler material with the plasticized sulfur and elemental sulfur involves maintaining the mixture at a temperature of 250° F.-260° F. for approximately one hour. If the organic yellow pigment is added to the mixture at a higher temperature, the degradation temperature of the pigment may be exceeded, which results in a marked degradation in the resulting paint color.

To overcome the problem of heat stability of the organic yellow pigment, the organic yellow pigment is preferably added to the mixture after the other solid filler materials have been mixed into the paint and the mixture has cooled to a temperature substantially below (preferably at least 10° F. below) the degradation temperature of the organic yellow pigment. It is therefore advantageous to add the organic pigment as the last step in the mixing process instead of adding the pigment along with the other solid filler material.

The following examples are illustrative of the invention.

EXAMPLE I

A plasticized sulfur composition was prepared by heating for about three hours at about 300° F. a mixture of 150 grams of ethyl cyclohexane dimercaptan, 112.5 grams of elemental sulfur and 21.43 grams of acrylic acid to form a plasticized sulfur composition. The plasticized sulfur composition was then deodorized by the addition of 85.65 grams of solvent stripping agent (preferably Isopar M) and distilling the stripping agent at a temperature of approximately 300° F. and under a partial vacuum (e.g., approximately 25 mm Hg). The resulting deodorized composition was mixed with 823.93 grams of molten elemental sulfur and about 222.75 grams of a thinning agent (preferably Santowax), such that the total weight of the liquid material was 1315.61 grams.

Solid filler material in the amount of 877.07 grams was then added to the liquid such that the liquid material represented approximately 60% by weight of the total mixture and the solid material represented approximately 40% by weight of the total mixture. The solid filler material was comprised of approximately 25% by weight titanium dioxide, 37.5% by weight silica and 37.5% by weight calcium carbonate. The mixture was heated to a temperature of approximately 250° F. for one hour with vigorous stirring to form a white sulfur-based paint with the requisite color, reflectivity and durability for use as a white road-marking material. Colorimeter readings were taken on the sample using a Hunter colorimeter. The readings were 71 (Y-axis), 67.7 (X-axis) and 67.3 (Z-axis).

EXAMPLE II

This example describes the manufacture of a white sulfur-based paint using essentially the same steps as described above with reference to Example I. In this Example, the solid filler material further included about 1% by weight of Kaolin so that the 877.07 grams of solid filler material is comprised of approximately 25% titanium dioxide, 36.25% silica, 36.25% calcium carbonate and 2.5% Kaolin by weight. The colorimeter readings of the sample were 75.3 (Y-axis), 71.8 (X-axis) and 73.5 (Z-axis).

EXAMPLE III

A yellow sulfur-based paint was prepared using essentially the same steps as set forth in Example I, except that the solid filler material further included lead chromate as a yellow color pigment. The 877.07 grams of solid filler material was comprised of approximately 36.25% silica, 36.25% calcium carbonate, 25% lead chromate and 2.5% titanium dioxide by weight. The colorimeter readings were 48.0 (Y-axis), 50.4 (X-axis) and 8.7 (Zaxis).

EXAMPLE IV

A yellow sulfur-based paint was prepared substantially in accordance with the process described above with reference to Example I, except that the solid filler material included an arylide yellow color pigment (Sunsperse 75). The 877.07 grams of solid filler material was comprised of approximately 37.5% silica, 37.5% calcium carbonate, 12.5% titanium dioxide and 12.5% arylide yellow pigment by weight. Furthermore, the arylide yellow pigment was added to the mixture after the other solid filler material was mixed into the paint and the mixture has cooled to a temperature of at least 10° F. below the degradation temperature of the arylide yellow pigment. The colorimeter readings were 50.5 (Y-axis), 53.8 (X-axis) and 17.0 (Z-axis).

EXAMPLE V

A yellow sulfur-based paint was prepared substantially in accordance with the process described above with reference to Example I, except that the solid filler material included two arylide yellow color pigments (Sunsperse 75 and 74). The 877.07 grams of solid filler material was comprised of approximately 42.5% silica, 42.5% calcium carbonate, 2.5% Sunsperse 75 pigment, 5% Sunsperse 74 pigment and 7.5% titanium dioxide. The arylide yellow pigments were added to the paint after the other solid filler material had been mixed into the paint and the paint had cooled to a temperature at least 10° F. below the degradation temperature of the pigments. The colorimeter readings were 58.5 (Y-axis), 60.6 (X-axis) and 13.3 (Z-axis).

In accordance with present invention, a sulfur-based paint is provided having color, durability, reflectivity and viscosity characteristics compatible with application as road-marking material. The paint can be manufactured as either a white or yellow-colored paint, depending upon the particular application. The viscosity of the paint is such that it can be rapidly applied to a road surface by conventional spraying equipment. The paint is substantially devoid of volatile materials, which not only enhances the durability of the paint, but also allows the paint to meet stringent environmental standards. The paint can be applied in relatively thin layers (i.e., about 15 mils thick) and bonds well to road surfaces,, such as new Portland cement. Furthermore, the paint is compatible to accommodate the addition of glass beads and other reflective material used on road surfaces.

Various embodiments of the invention have now been described in detail. Since it is obvious that many changes in and additions to the above-described preferred embodiment may be made without departing from the nature, spirit and scope of the invention, the invention is not to be limited to said details, except as set forth in the appended claims.

What is claimed is:

1. A sulphur-based composition comprising plasticized sulphur and elemental sulphur in a ratio of about one part plasticized sulphur to three parts elemental sulphur by weight with the aggregate amount of said plasticized sulfur and said elemental sulfur being about 60% by weight of the composition, said composition further including solid filler in an amount of about 40% by weight of the composition, said solid filler including approximately equal amounts by weight of an arylide yellow pigment and titanium dioxide.

2. The composition of claim 1 wherein the quantity of each of the arylide yellow pigment and the titanium dioxide is in the range of 5%–15% by weight of the solid filler.

3. The composition of claim 1 wherein said plasticized sulphur is a plasticized sulphur which has been deodorized with an aliphatic straight chain solvent in a ratio of solvent-to-plasticized sulphur of about 1:3 to 1:4.5 parts by weight under reduced pressure at a temperature in the range of about 290° F.–320° F., said solvent having approximately 79% by weight paraffin and approximately 21% by weight cycloparaffin and an initial boiling point about 350° F. and the overall boiling point range of less than 100° F.

4. The composition of claim 1 wherein said plasticized sulphur is comprised of about 14 parts by weight polythiol, 10.5 parts by weight elemental sulphur and 2 parts by weight viscosity control agent, said composition further including a thinning agent in an amount of about 81% by weight of the combined weights of the elemental sulphur and polythiol in the plasticized sulphur.

5. The composition of claim 4, wherein said thinning agent is a mixture of orthoterphenyls, paraterphenyls and metaterphenyls.

6. The composition of claim 4 wherein said viscosity control agent is acrylic acid.

7. The composition of claim 1 wherein the arylide yellow pigment is selected from a first arylide yellow pigment having the formula $C_{18}H_{17}ClN_4O_5$ and a second arylide yellow pigment having the formula $C_{17}H_{15}ClN_4O_5$.

8. A yellow sulphur-based paint comprising plasticized sulphur and elemental sulphur in a ratio of about 1 part plasticized sulphur to 3 parts elemental sulphur and solid filler in an amount of about 40% by weight of the composition, said solid filler including first and second arylide yellow pigments and titanium dioxide in an amount by weight approximately equal to the combined weights of the first and second arylide yellow pigments, said first arylide yellow pigment having the formula $C_{18}H_{17}ClN_4O_5$ and said second arylide yellow pigment having the formula $C_{17}H_{15}ClN_4O_5$, said plasticized sulphur being comprised of about 14 parts by weight polythiol, about 10.5 parts by weight elemental sulphur and about 2 parts by weight viscosity control agent, said composition further including a thinning agent in an amount of about 81% by weight of the combined weights of the elemental sulphur and the polythiol in the plasticized sulphur.

* * * * *